(12) United States Patent
Miyamoto et al.

(10) Patent No.: US 6,264,729 B1
(45) Date of Patent: Jul. 24, 2001

(54) WATER BASED INK COMPOSITION FOR WRITING INSTRUMENT

(75) Inventors: Masaru Miyamoto; Shigeru Miyazaki; Yoji Takeuchi, all of Yokohama (JP)

(73) Assignee: Mitsubishi Pencil Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/462,364

(22) PCT Filed: Jul. 7, 1998

(86) PCT No.: PCT/JP98/03041

§ 371 Date: Jan. 6, 2000

§ 102(e) Date: Jan. 6, 2000

(87) PCT Pub. No.: WO99/02617

PCT Pub. Date: Jan. 21, 1999

(30) Foreign Application Priority Data

Jul. 7, 1997 (JP) .................................................. 9-181391
Jul. 31, 1997 (JP) .................................................. 9-206136

(51) Int. Cl.$^7$ .................................................... C09D 11/00
(52) U.S. Cl. ...................................... 106/31.36; 106/31.68
(58) Field of Search ................................ 106/31.36, 31.68

(56) References Cited

U.S. PATENT DOCUMENTS

| 3,949,132 | * | 4/1976 | Seregely et al. ..................... 428/207 |
| 4,163,675 | * | 8/1979 | Hirano et al. ..................... 106/31.43 |
| 4,592,756 | * | 6/1986 | Kawasaki et al. ................ 106/31.52 |
| 5,302,195 | * | 4/1994 | Helbrecht et al. ................ 106/31.36 |
| 5,667,572 | * | 9/1997 | Tanguchi et al. ................. 106/31.36 |
| 5,854,320 | * | 12/1998 | Nakamura et al. .................... 524/48 |
| 5,954,866 | * | 9/1999 | Ohta et al. ........................ 106/31.89 |

FOREIGN PATENT DOCUMENTS

| 5-140498 | 6/1993 | (JP) . |
| 8-277302 | 10/1996 | (JP) . |

* cited by examiner

*Primary Examiner*—Helene Klemanski
*Assistant Examiner*—Veronica F. Faison
(74) *Attorney, Agent, or Firm*—Darby & Darby

(57) ABSTRACT

Provided is an ink composition comprising at least a colorant and water, wherein the ink composition further contains 0.5 to 15% by weight of reduced dextrin or reduced maltodextrin based on the total weight of the ink composition. It is a water based ink composition for a ball point pen which is excellent in dryout resistance and is safe and which does not cause a fluctuation in a viscosity and a pH with the passage of time.

3 Claims, No Drawings

WATER BASED INK COMPOSITION FOR WRITING INSTRUMENT

TECHNICAL FIELD

The present invention relates to a water based ink composition for a writing instrument which is excellent in clogging resistance at a pen tip and dryout resistance, more specifically to a shear thinning, water based ink for a ball point pen having advantages of a ball point pen using an oil based ink, that is, a pseudoplastic water based ink composition for a ball point pen.

BACKGROUND ART

In general, inks for a ball point pen have so far been classified into a low-viscosity, water based ink for a ball point pen which contains a solvent comprising a water based solvent such as water and has an ink viscosity of 10 mPa·s or less and a high-viscosity, oil based ink which contains a solvent comprising an oil based solvent such as mineral oil, a polyhydric alcohol, a fatty acid and cellosolve and has an ink viscosity of 1000 to 20000 mPa·s.

A ball point pen using an oil based ink for a ball point pen has such structure that the ink adhered on a ball through an ink reservoir having a small diameter is transferred onto a paper surface by rotation of the ball and only the transferred portion of the ink is fed from the reservoir to the ball.

A ball point pen using a water based ink for a ball point pen has such structure that the ink is fed to a ball surface and a paper surface by virtue of capillary action of a feed prepared by binding fine fibers.

While a water based ink and an oil based ink for a ball point pen each have advantages, they have various problems as well. For example, the water based ink for a ball point pen has a low viscosity, and therefore only if the point of the ball point pen is simply brought into contact with paper, capillary action is exerted on the contact point thereof to feed the ink. The ink makes it possible to write fine lines on a paper surface without requiring so higher writing pressure and scarcely produces splitting, starving and blobbing. On the contrary, storing the ink directly in the ink reservoir allows the ink to seep due to vibrations, impacts and a rise in an open air temperature as well as to make the amount of the ink to be fed to the ball unstable. Accordingly, complicated structure having a feed prepared by binding fine fibers is required. Further, involved is the problem that it is difficult to observe the remaining amount of the ink.

On the other hand, an oil based ink for a ball point pen is characterized by that because of a high viscosity thereof, blobbing of the ink from the pen tip can be prevented and the ink can be stored directly in the ink reservoir having a small diameter, so that the structure of the ball point pen can be simplified and that the remaining amount of the ink can be observed by using a transparent material for the ink reservoir. On the contrary, there are involved the problems that since the ink is transferred only on a paper surface contacted with the rotating ball, splitting and starving are liable to be caused if the ball rotates unstably and that since the ink hardly penetrates into a paper surface, blobbing which causes stain with the untransferred ink is apt to be caused.

In recent years, in order to solve such problems, developed are water based inks for a ball point pen in which a gelatinizer and a water-soluble paste are added to impart a specific viscosity characteristic to the ink (hereinafter referred to as a pseudoplastic water based ink).

A ball point pen using this pseudoplastic water based ink is reduced in an ink viscosity by shear force which is applied to the ink by rotation of the ball at the tip point when writing and can write as smoothly as a ball point pen using a water based ink and make good lines on a paper surface. Further, blobbing of the ink from the pen point can be prevented because the ink has a high viscosity when the pen is not used for writing. The ink can be stored directly into the ink reservoir, so that the structure of the ball point pen can be simplified, and the use of a transparent material for the ink reservoir makes it possible to check the remaining amount of the ink.

Thus, the use of the pseudoplastic water based ink for a ball point pen provides a writing instrument having both characteristics of a ball point pen using a water based ink and a ball point pen using an oil based ink. However, a water based ink contains water as a principal solvent, and if water contained therein is evaporated, it has a difficulty in writing, because dissolved substances and mixtures contained in the ink are concentrated, deposited, dried and solidified at the point of the writing instrument to cause clogging and a rise in the viscosity of the ink. Accordingly, it has so far been proposed to add a less volatile agent for solubilizing a dye or a less volatile aid for dissolving a dye, such as urea, thiourea, polyhydric alcohols or derivatives thereof, tetrahydrofurfuryl alcohol, 4-methoxy-4-methylpentane-2-one, ethylene oxide adducts of p-toluenesulfonamide, thiodiethanol and alkanolamine, and sorbitol.

However, satisfactory water based ink compositions have not been obtained because inks blended with the various additives described above do not have a sufficient effect on dryout resistance and further have the problem that the viscosities are increased so as to bring about inferior follow-up of ink and that the additives have unsuitably toxicity.

Further, dextrin and maltodextrin which have reducing end groups and are represented as starch decomposition products or glucose polymers are added. However, while they have dryout resistance at a pen tip, blending them into an ink promotes the reaction between them and amino groups in a pH controlling agent and a water-soluble resin contained in the ink components (Maillard reaction) with the passage of time because they are nonreduced sugars, so that brought about is the problem that a pH of the ink is reduced.

The present invention has been made in order to solve the conventional problems described above, and an object of the present invention is to provide a water based ink composition for a writing instrument which has excellent dryout resistance and is safe and in which the viscosity and pH do not vary with the passage of time, particularly a pseudoplastic water based ink for a ball point pen.

DISCLOSURE OF THE INVENTION

Intensive researches continued by the present inventors in order to solve the problems described above have resulted in attaining to the invention of a water based ink composition for a writing instrument which comprises at least a colorant and water, wherein the ink composition further contains 0.5 to 15% by weight of reduced dextrin or reduced maltodextrin based on the total weight of the ink composition. Other prescribed water-soluble liquid media may be added to the water based ink composition for a writing instrument in the present invention alone or in combination of a plurality thereof.

Further, in order to prepare a pseudoplastic water based ink composition for a ball point pen, a viscosity-controlling agent is added to impart a pseudoplasticity to the ink composition. The viscosity thereof is preferably 100 to 4000 mPa·s at a shear rate of 3.84 s$^{-1}$.

BEST MODE FOR CARRYING OUT THE INVENTION

The respective components used in the water based ink composition for a writing instrument in the present invention shall be explained.

Reduced dextrin or reduced maltodextrin added to the water based ink composition for a writing instrument in the present invention is non-toxic and safe saccharides which are usually used as an edible sweetening and is characterized by that it has a high solubility in water and has a very excellent water retentivity.

A water based ink composition for a writing instrument containing this reduced dextrin or reduced maltodextrin is safe and improves dryout resistance without causing the problem that the ink viscosity and pH vary with the passage of time.

Since reduced dextrin or reduced maltodextrin does not exert an adverse influence on the properties of ink compositions usually used and does not change a hydrogen ion concentration in the ink, it does not exert an adverse influence on anionic and cationic substances and therefore has the advantage that a colorant can optionally be selected from all of aqueous dyes and organic or inorganic pigments. The content of reduced dextrin or reduced maltodextrin in the water based ink composition of the present invention is preferably 0.5 to 15% by total weight based on the weight of the ink composition. If the content is smaller than 0.5% by weight, the effect on the dryout resistance is reduced, and if it is larger than 15% by weight, the spinnability becomes stronger, so that the writing feeling is deteriorated.

As described above, all dyes and pigments which can be dissolved or dispersed in water based liquid media can be used as the colorant. To give specific examples thereof, there can be used acid dyes such as Eosine, Phloxine, Water Yellow #6-C, acid red, Water Blue #105, Brilliant Blue FCF and Nigrosine NB, direct dyes such as Direct Black 154, Direct Sky Blue 5B and Violet BB, basic dyes such as Rhodamine and Methyl Violet, inorganic pigments such as titanium dioxide, carbon black and ultramarine, organic pigments such as Copper Phthalocyanine Blue and Benzidine Yellow, and various metal powders. They can be used alone or in a mixture of two or more kinds thereof.

When a pigment is used as the colorant, a water-soluble polymer dispersant and a surfactant have to be suitably selected and blended. The water-soluble polymer includes anionic polymers such as polyacrylic acid salts, salts of a styrene-acrylic acid copolymer, salts of a styrene-maleic acid copolymer, salts of a vinylnaphthalene-maleic acid copolymer and β-naphthalenesulfonic acid-formalin condensation product, and nonionic polymers such as polyvinyl alcohol, polyvinylpyrrolidone and polyethylene glycol.

Water can be used as the principal medium, and all media having polar groups which are miscible with water can be used as the liquid medium. There can be used, for example, ethylene glycol, diethylene glycol, triethylene glycol, polyethylene glycol, propylene glycol, ethylene glycol monomethyl ether, glycerin, pyrrolidone and triethanolamine.

To be specific, there can be used as the viscosity-controlling agent which is added to impart a pseudoplasticity to the ink composition, polyacrylic acid salts, cross-linking type acrylic acid polymers, salts of a styrene-acrylic acid copolymer, salts of a styrene-maleic acid copolymer, nonionic polymers such as polyvinylpyrrolidone and polyethylene glycol, and polysaccharides such as xanthan gum, guar gum, casein and gum arabic.

Further, the ink which is controlled by them has a viscosity falling in a range of 100 to 4000 mPa·s, preferably 200 to 2000 mPa·s and more preferably 300 to 1000 mPa·s at a shear rate of $3.84 \text{ s}^{-1}$. If the viscosity of the ink is lower than 100 mPa·s, the ink is blobbed from the pen tip. Further, when a colorant having a large specific gravity such as titanium dioxide and metal powder is used, the viscosity has to be controlled to be rather high in order to prevent the colorant from settling, and the upper limit thereof is preferably 4000 mPa·s. If the upper limit exceeds 4000 mPa·s, there is a misgiving of bringing about reduction in the writing property due to inferior follow-up of ink.

Controlling agents other than the components described above, which can be used if necessary, include a lubricant such as polyalkylene glycol derivatives, fatty acid alkali salts, nonionic surfactants and fluorine base surfactants, a rust preventive such as benzotriazole and saponins, a pH controlling agent such as potassium hydroxide and potassium phosphate, and a preservative such as sodium omadine and 1,2-benzoisothiazoline.

The water based ink composition for a writing instrument in the present invention can easily be obtained by dissolving the components described above, if necessary, with heating and mixing under stirring.

EXAMPLES

The present invention shall more specifically be explained below with reference to examples, but the present invention shall by no means be restricted by these examples.

Example 1

A blue, water based pigment ink composition for a ball point pen was prepared according to the following recipe:

| | |
|---|---|
| Phthalocyanine blue (colorant) | 8.0% by weight |
| Styrene-acrylic acid resin ammonium salt (dispersant) | 3.0% by weight |
| Ethylene glycol (liquid medium) | 20.0% by weight |
| Reduced dextrin | 5.0% by weight |
| Phosphoric acid ester (lubricant) | 0.7% by weight |
| 1,2-Benzoisothiazolone salt (preservative) | 0.3% by weight |
| Aminomethylpropanol (pH controlling agent) | 0.3% by weight |
| Benzotriazole (rust preventive) | 0.2% by weight |
| Ion-exchanged water | balance |

Example 2

A blue, water based pigment ink composition for a ball point pen was prepared according to the following recipe:

| | |
|---|---|
| Phthalocyanine blue (colorant) | 8.0% by weight |
| Styrene-acrylic acid resin | 3.0% by weight |

-continued

| | |
|---|---|
| ammonium salt (dispersant) | |
| Ethylene glycol (liquid medium) | 20.0% by weight |
| Reduced maltodextrin | 4.0% by weight |
| Phosphoric acid ester (lubricant) | 0.5% by weight |
| 1,2-Benzoisothiazolone salt (preservative) | 0.3% by weight |
| Aminomethylpropanol (pH controlling agent) | 0.3% by weight |
| Benzotriazole (rust preventive) | 0.2% by weight |
| Ion-exchanged water | balance |

Example 3

A black, water based ink composition for a ball point pen was prepared according to the following recipe:

| | |
|---|---|
| Carbon black (colorant) | 8.0% by weight |
| Styrene-maleic acid resin ammonium salt (dispersant) | 3.0% by weight |
| Reduced dextrin | 3.0% by weight |
| Potash soap (lubricant) | 0.5% by weight |
| Propylene glycol (liquid medium) | 20.0% by weight |
| 1,2-Benzoisothiazolone salt (preservative) | 0.3% by weight |
| Aminomethylpropanol (pH controlling agent) | 0.3% by weight |
| Benzotriazole (rust preventive) | 0.2% by weight |
| Cross-linking type acrylic acid polymer (viscosity controlling agent) | 0.4% by weight |
| Ion-exchanged water | balance |

Example 4

A black, water based ink composition for a felt-tip pen was prepared according to the following recipe:

| | |
|---|---|
| Carbon black (colorant) | 8.0% by weight |
| Styrene-maleic acid resin ammonium salt (dispersant) | 3.0% by weight |
| Reduced dextrin | 3.0% by weight |
| Ethylene glycol (liquid medium) | 20.0% by weight |
| 1,2-Benzoisothiazolone salt (preservative) | 0.3% by weight |
| Aminomethylpropanol (pH controlling agent) | 0.3% by weight |
| Benzotriazole (rust preventive) | 0.2% by weight |
| Ion-exchanged water | balance |

Comparative Example 1

Reduced dextrin was removed from the ink composition of Example 1 to obtain a blue, water based ink composition for a ball point pen.

Comparative Example 2

Reduced maltodextrin was removed from the ink composition of Example 2, and 5% by weight of urea was added to obtain a blue, water based ink composition for a ball point pen.

Comparative Example 3

Reduced dextrin was removed from the ink composition of Example 3, and 3% of nonreduced dextrin was added to obtain a black, water based ink composition for a ball point pen.

Comparative Example 4

Reduced dextrin was removed from the ink composition of Example 4 to obtain a black, water based ink composition for a felt-tip pen.

Evaluation Method

The ink compositions obtained according to the foregoing recipes of Examples 1 to 3 and the ink compositions obtained according to the recipes of Comparative Examples 1 to 3 were charged respectively into ball point pens having a ball diameter of 0.7 mm, and the ink compositions obtained according to the recipes of Example 4 and Comparative Example 4 were charged respectively into commercially available felt-tip pens. They were left standing with the caps unfastened, and the time passed until starving was caused was determined. Further, a change in the viscosity and pH of the ink compositions after stored at 50° C. for one month from those of the initial ink composition was observed.

The results thereof are shown in Table 1.

TABLE 1

| | Example | | | | Comparative Example | | | |
|---|---|---|---|---|---|---|---|---|
| | 1 | 2 | 3 | 4 | 1 | 2 | 3 | 4 |
| Time until starving | 30 days | 30 days | 15 days | 16 hours | 10 days | 20 days | 15 days | 5 hours |
| Viscosity change | None | None | None | None | None | Rise | None | None |
| pH change | None | None | None | None | None | None | Reduced | None |

Example 5

A blue, pseudoplastic water based pigment ink composition for a ball point pen was prepared according to the following recipe:

| | |
|---|---|
| Phthalocyanine blue (colorant) | 8.0% by weight |
| Styrene-acrylic acid resin ammonium salt (dispersant) | 3.0% by weight |
| Ethylene glycol (liquid medium) | 20.0% by weight |
| Reduced dextrin | 5.0% by weight |
| Phosphoric acid ester (lubricant) | 0.7% by weight |
| 1,2-Benzoisothiazolone salt (preservative) | 0.3% by weight |
| Aminomethylpropanol (pH controlling agent) | 0.3% by weight |
| Benzotriazole (rust preventive) | 0.2% by weight |
| Polyacrylic acid salt (acryl base synthetic polymer) (viscosity controlling agent) | 0.4% by weight |
| Ion-exchanged water | balance |

Example 6

A blue, pseudoplastic water based pigment ink composition for a ball point pen was prepared according to the following recipe:

| | |
|---|---|
| Phthalocyanine blue | 8.0% by weight |
| Styrene-acrylic acid resin ammonium salt | 3.0% by weight |
| Ethylene glycol | 20.0% by weight |

-continued

| | |
|---|---|
| Reduced maltodextrin | 4.0% by weight |
| Phosphoric acid ester | 0.5% by weight |
| 1,2-Benzoisothiazolone salt | 0.3% by weight |
| Aminomethylpropanol | 0.3% by weight |
| Benzotriazole | 0.2% by weight |
| Polyacrylic acid salt (acryl base synthetic polymer | 0.4% by weight |
| Ion-exchanged water | balance |

Example 7

A black, pseudoplastic water based pigment ink composition for a ball point pen was prepared according to the following recipe:

| | |
|---|---|
| Carbon black | 8.0% by weight |
| Styrene-maleic acid resin ammonium salt | 3.0% by weight |
| Reduced dextrin | 10.0% by weight |
| Potash soap (lubricant) | 0.5% by weight |
| Propylene glycol | 20.0% by weight |
| 1,2-Benzoisothiazolone salt | 0.3% by weight |
| Aminomethylpropanol | 0.3% by weight |
| Benzotriazole | 0.2% by weight |
| Cross-linking type acrylic acid polymer (viscosity controlling agent) | 0.4% by weight |
| Ion-exchanged water | balance |

Comparative Example 5

A blue, water based ink composition for a ball point pen was prepared in the same manner as in Example 5, except that reduced dextrin was not compounded.

Comparative Example 6

A blue, pseudoplastic water based pigment ink composition for a ball point pen was prepared in the same manner as in Example 6, except that reduced maltodextrin was not compounded and 5% by weight of urea was added.

Comparative Example 7

A black, pseudoplastic water based ink composition for a ball point pen was prepared in the same manner as in Example 7, except that reduced dextrin was not compounded and 3% by weight of nonreduced dextrin was added.

Evaluation Method

The ink compositions obtained according to the foregoing recipes of Examples 5 to 7 and the ink compositions obtained according to the recipes of Comparative Examples 5 to 7 were charged respectively into ball point pens having a ball diameter of 1.0 mm. They were left standing with the caps unfastened, and the time passed until starving was caused was determined. Further, the viscosity of the initial ink compositions at a shear rate of 3.84 $s^{-1}$ and a change in the viscosity and pH of the ink compositions after stored at 50° C. for one month from those of the initial ink compositions were determined. The results thereof are shown in Table 2. The viscosity of the initial ink composition in Example 3 is shown as well.

TABLE 2

Performance evaluation of the ink compositions

| | Example | | | | Comparative Example | | |
|---|---|---|---|---|---|---|---|
| | 3 | 5 | 6 | 7 | 5 | 6 | 7 |
| Time until starving | 15 days | 10 days | 15 days | 12 days | 3 days | 5 days | 15 days |
| Initial viscosity of ink mPa · s | 500 | 700 | 500 | 700 | 750 | 800 | 550 |
| Viscosity change | None | None | None | None | None | Rise | None |
| pH change | None | None | None | None | None | None | Reduced |

The evaluation results of the time passed until starving was caused and the change after storage at 50° C. for one month in the water based ink compositions for a writing instrument of the present invention are as shown in the tables described above. In contrast with the comparative examples in which reduced dextrin and reduced maltodextrin, which are specific additives in the present invention, were not added, the defect that the viscosity and the pH vary with the passage of time is not brought about in the examples, and the dryout resistance is improved very much.

The time passed until starving was caused after left standing with the caps unfastened is longer in the case of the present invention, and it has been found that the dryout resistance is improved very much.

Industrial Applicability

The water based ink composition of the present invention for a writing instrument is excellent in dryout resistance and is safe. It does not cause a fluctuation in a viscosity and a pH with the passage of time and can be applied to a ball point pen using a water based ink and a felt-tip pen.

What is claimed is:

1. A water based ink composition for a writing instrument comprising at least a colorant and water, wherein the ink composition further contains 0.5 to 15% by weight of reduced dextrin or reduced maltodextrin based on the total weight of the ink composition.

2. A pseudoplastic water based ink composition for a ball point pen provided with a pseudoplasticity by adding a viscosity-controlling agent to the water based ink composition for a writing instrument as described in claim 1.

3. The pseudoplastic water based ink composition for a ball point pen as described in claim 2, wherein said ink composition has a viscosity of 100 to 4000 mPa's at a shear rate of 3.84 $s^{-1}$.

* * * * *